(12) United States Patent
Hattori et al.

(10) Patent No.: US 6,432,024 B2
(45) Date of Patent: Aug. 13, 2002

(54) SHIFT CONTROL APPARATUS FOR CONTINUOUSLY VARIABLE TRANSMISSION OF MOTOR VEHICLE

(75) Inventors: Yuji Hattori, Bisai; Kenji Matsuo, Toyota; Hiroji Taniguchi, Okazaki; Takashi Inoue, Nissin; Katsumi Kono, Toyota, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/756,234

(22) Filed: Jan. 9, 2001

(30) Foreign Application Priority Data

Jan. 27, 2000 (JP) .......................................... 2000-018688

(51) Int. Cl.⁷ ............................................... F16H 61/12
(52) U.S. Cl. .......................................... 477/44; 477/906
(58) Field of Search ............................ 477/37, 43, 44, 477/45, 46, 906; 701/62, 63

(56) References Cited

U.S. PATENT DOCUMENTS 4,823,644 A * 4/1989 Ohkumo ........................ 477/44

6,292,730 B1 * 9/2001 Takizawa et al. ............. 477/68

FOREIGN PATENT DOCUMENTS

JP        2616154        3/1997

* cited by examiner

Primary Examiner—Charles A Marmor
Assistant Examiner—Ankur Parekh
(74) Attorney, Agent, or Firm—Oblon, Spivak, McClelland, Maier & Neustadt, P.C.

(57) ABSTRACT

A shift control apparatus for a motor vehicle including an internal combustion engine and a continuously variable transmission (CVT) is provided for controlling the speed ratio of the CVT depending upon operating conditions of the vehicle. The control apparatus determines whether an electronic throttle valve of the engine is at fault or not, and restricts the speed ratio of the CVT when the throttle valve is at fault such that the input-side rotation speed of the transmission is variable within a range that is narrower than a range in which the rotation speed is variable during normal running of the vehicle. The range of the input-side rotation speed may be defined by the upper limit, or the lower limit, or both the upper limit and the lower limit.

20 Claims, 7 Drawing Sheets

F I G. 6
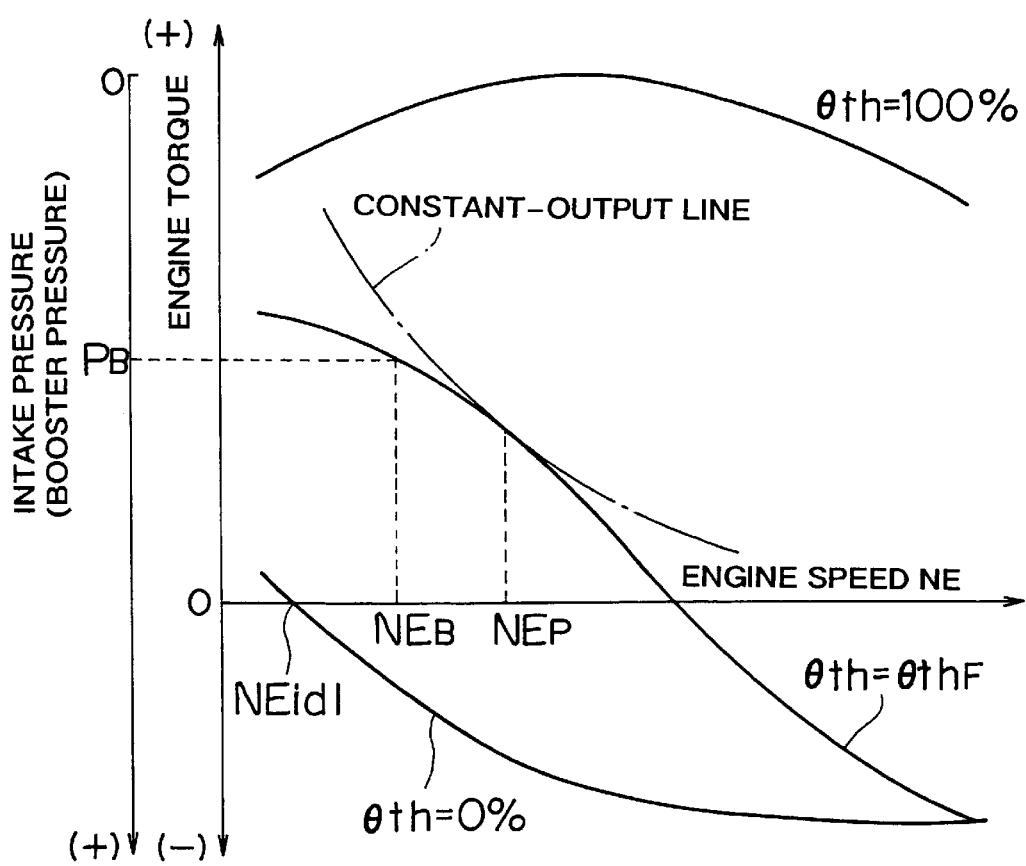

SHIFT CONTROL APPARATUS FOR CONTINUOUSLY VARIABLE TRANSMISSION OF MOTOR VEHICLE

The disclosure of Japanese Patent Application No. 2000-018688 filed on Jan. 27, 2000 including the specification, drawings and abstract is incorporated herein by reference in its entirety.

BACKGROUND OF THE INVENTION

1. Field of the Invention

The invention relates to a shift control apparatus for a continuously variable transmission of a motor vehicle. In particular, the invention is concerned with shift control of a continuously variable transmission when an electronic throttle valve is faulty.

2. Description of the Related Art

There is known a shift control apparatus for a motor vehicle including (a) an internal combustion engine whose output is controlled by an electronic throttle valve for adjusting the flow rate of intake air, and (b) a continuously variable transmission disposed in a power transmission path between the engine and drive wheels, for changing the speed ratio. The shift control apparatus is adapted to control the speed ratio of the continuously variable transmission in accordance with operating or driving conditions of the vehicle. In general, shift control of the continuously variable transmission is performed according to predetermined shift conditions in the form of, for example, a map, using the output requirement indicated by the driver, such as an accelerator operation amount, and the vehicle speed as parameters. The shift conditions are usually determined such that the speed ratio (=the input-side rotation speed/the output-side rotation speed) increases with an increase in the output requirement and with a reduction in the vehicle speed.

When the electronic throttle valve fails, the output of the engine cannot be controlled with the opening of the throttle valve being maintained at a certain degree, but it has been proposed to perform special shift control that enables "limp-home", namely, permits the vehicle to limp or travel to a nearby repair shop, or the like. For example, an apparatus as disclosed in Japanese Patent No. 2616154 is adapted to perform shift control solely based on the output requirement made by the driver (i.e., the power demanded by the driver) when the throttle valve is faulty.

If shift control is performed solely based on the output requirement, and if the output requirement is kept large when the driver continues to depress the accelerator pedal in an attempt to increase the vehicle speed, for example, the rotation speed of the engine increases as a result of an increase in the speed ratio of the continuously variable transmission. As a result, the torque, and accordingly the output, are reduced, which produces a reduction or deterioration in the running performance (driving torque). Namely, even if the valve opening of the electronic throttle valve is kept constant, the output of the engine changes in accordance with the rotation speed, as shown in FIG. 7 by way of example, such that the engine output is gradually reduced after it reaches its maximum at a certain engine speed ($NE_P$ in FIG. 7). Thus, even if the torque is amplified in accordance with the speed ratio of the continuously variable transmission, a sufficiently large driving torque may not be obtained.

In the meantime, where a brake booster is provided for assisting the braking force by use of the intake manifold negative pressure of the engine, the intake manifold negative pressure is reduced when the electronic throttle valve fails and is maintained at a predetermined valve opening (e.g., when $\theta_{th}=\theta_{thF}$), as compared with the case where the electronic throttle valve is completely closed ($\theta_{th}=0\%$), as shown in FIG. 6. Also, in this case, the intake manifold negative pressure tends to be reduced with a reduction in the engine speed (NE). Thus, if the rotation speed of the engine is reduced in accordance with a reduction in the vehicle speed when the vehicle is stopped, for example, a required booster pressure (e.g., the minimum booster pressure PB) cannot be obtained, with the result that the brake assist force is reduced, and the driver feels uncomfortable when applying a brake to the vehicle.

Here, it is to be understood that the magnitude of the negative pressure is considered being opposite to that of the positive pressure. Namely, the reduction in the negative pressure means that the pressure increases to be close to the atmospheric pressure (at which the negative pressure is equal to zero).

SUMMARY OF THE INVENTION

It is an object of the invention to provide a shift control apparatus that performs shift control on a continuously variable transmission, while avoiding reductions in the driving torque or the assist force of a brake booster due to a failure in an electronic throttle valve, and thus preventing the driver from feeling uncomfortable due to the reduction in the torque or brake assist force.

To accomplish the above and other objects, the invention provides a shift control apparatus for a motor vehicle including an internal combustion engine whose output is controlled by an electronic throttle valve for adjusting the flow rate of intake air, and a continuously variable transmission disposed in a power transmission path between the internal combustion engine and drive wheels and operable to change a speed ratio thereof, comprising a shift control device that controls the speed ratio of the continuously variable transmission depending upon operating conditions of the vehicle such that an input-side rotation speed of the transmission is variable within a first range during normal running of the vehicle; a fault detecting unit that determines whether the electronic throttle valve is faulty or not; and a restricting unit that restricts the speed ratio of the continuously variable transmission such that the input-side rotation speed of the transmission is variable within a second range when the fault detecting unit determines that the electronic throttle valve is faulty, the second range being set to be narrower than the first range.

In one preferred form of the invention, the restricting unit comprises an upper-limit setting unit that sets an upper limit of the input-side rotation speed of the continuously variable transmission and restricts the speed ratio of the transmission so that the input-side rotation speed does not exceed the upper limit when the electronic throttle valve is faulty.

In the above form of the invention, since the speed ratio is restricted so that the input-side rotation speed does not exceed the upper limit when the electronic throttle valve is faulty, the rotation speed of the engine is also controlled to be equal to or lower than a predetermined value that corresponds to the upper limit of the input-side rotation speed. If the upper limit of the input-side rotation speed is set in the vicinity of a rotation speed at which the output of the internal combustion engine reaches its maximum, an excessive increase in the engine speed and a resulting reduction in the output can be advantageously prevented. Thus, the upper limit of the input-side rotation speed can be suitably determined in view of the problems associated with a failure in the throttle valve, thereby to cause the engine to operate at desired operating conditions.

In another preferred form of the invention, the restricting unit comprises a lower-limit setting unit that sets a lower limit of the input-side rotation speed of the continuously variable transmission, and restricts the speed ratio of the transmission so that the input-side rotation speed does not fall below the lower limit when the electronic throttle valve is faulty.

In the above form of the invention, since the speed ratio of the transmission is restricted so that the input-side rotation speed does not fall below the lower limit when the electronic throttle valve is faulty, the engine speed is also controlled to be equal to or higher than a predetermined value corresponding to the lower limit of the input-side rotation speed. If the lower limit of the input-side rotation speed is set in the vicinity of a rotation speed at which a certain intake manifold negative pressure required for operating the brake booster is obtained by an operation of the engine, an excessive reduction in the engine speed and a resulting reduction in the booster pressure can be advantageously prevented. Thus, the lower limit of the input-side rotation speed can be suitably determined in view of the problems associated with a failure in the throttle valve, thereby to cause the engine to operate at desired operating conditions.

BRIEF DESCRIPTION OF THE DRAWINGS

FIG. 6 is a graph showing an example of torque characteristics of an engine when an electronic throttle valve is faulty.

DETAILED DESCRIPTION OF THE PREFERRED EMBODIMENTS

Figure 1:
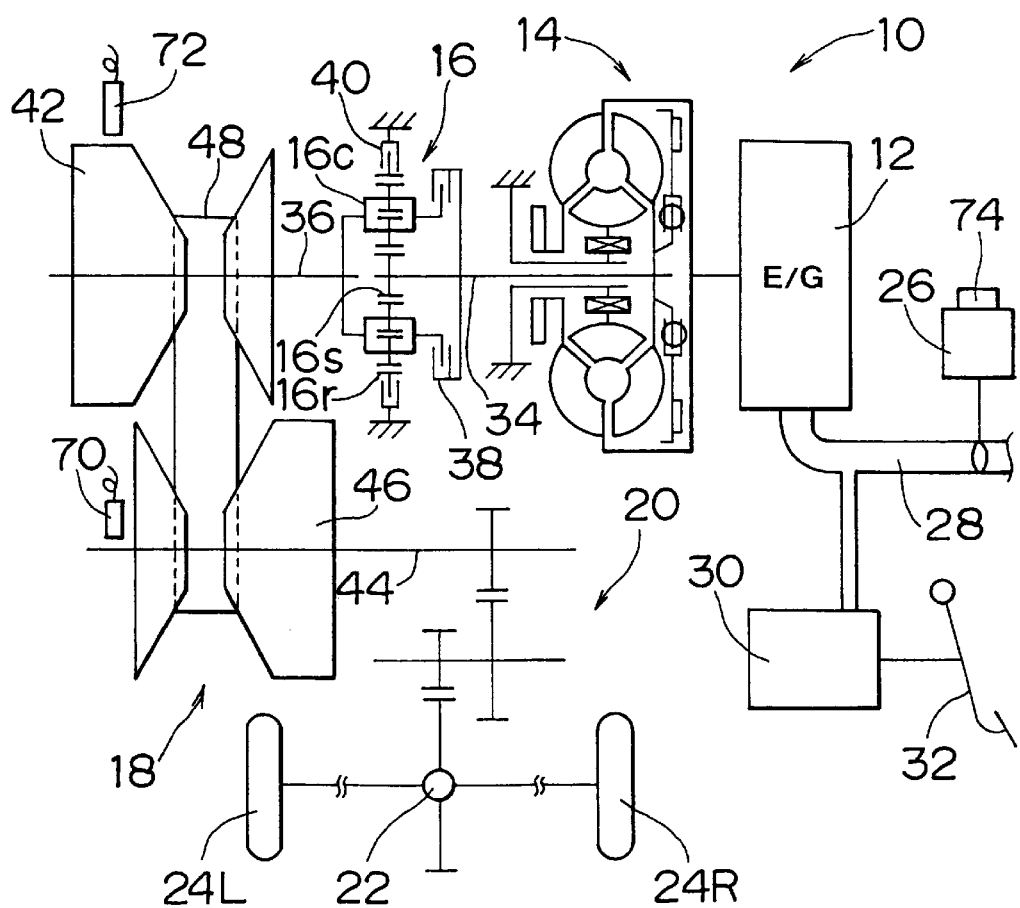
FIG. 1 is a schematic view of a drive unit of a vehicle to which the invention is applied.

In principle, when an electronic throttle valve fails, a shift control apparatus according to the invention performs shift control on a continuously variable transmission based on an output requirement made by the driver, such as an operation amount of an accelerator pedal, or an operating status of a brake, or the like, as disclosed, for example, in Japanese Patent No. 2616154. However, the shift control apparatus may perform shift control in various other fashions; for example, even in the event of a failure in an electronic throttle valve, the apparatus may perform shift control using shift conditions (such as a map) for normal running, in which vehicle operating conditions, such as an output requirement and a vehicle speed, are used as parameters. More specifically, the shift control apparatus may calculate a target speed ratio and control an actual speed ratio to be equal to the target speed ratio. In another method, the shift control apparatus may calculate a target rotation speed of the input shaft of the transmission based on a vehicle speed, actual rotation speed of the output shaft of the transmission and others, and control an actual rotation speed of the input shaft to be equal to the target rotation speed. Since the target input-shaft speed corresponds to the target speed ratio, there is no need to obtain the target speed ratio itself.

A failure in the electronic throttle valve may be a mechanical failure in the throttle valve itself or a drive unit (such as an electric motor), or may be an electric failure in a control system for controlling opening/closing of the throttle valve. In short, the failure in the throttle valve may be of any type, provided the internal combustion engine may operate with a certain throttle opening (a certain degree of opening of the valve), though the throttle opening cannot be controlled. In the event of an electric failure, for example, it is desirable to fix or set the throttle opening to a predetermined degree (provided for the occasion of a failure), by means of a spring or the like. However, the invention can also be applied to the case where the electronic throttle valve becomes uncontrollable at an arbitrary throttle opening. In this case, the throttle opening at the time of a failure may be detected using a sensor or the like. The predetermined throttle opening for the occasion of a failure, in other words the "limp home" position of the throttle valve, is desirably set, for example, within a range of 5% to 20%, depending upon the output characteristics of the engine and others, so as to provide certain running performance required for limp-home without significantly affecting braking operations.

The upper and lower limits of the input-side rotation speed at the time of a failure are suitably set based on the output characteristics, torque characteristics and the intake manifold negative-pressure characteristics of the engine, which are determined in accordance with the throttle opening of the electronic throttle valve at the time of the failure. Where the throttle valve is fixed at a predetermined throttle opening (limp home position), the upper and lower limits may be set to predetermined values. If the electronic throttle valve becomes uncontrollable at an arbitrary throttle opening, the upper and lower limits may be set in accordance with the actual throttle opening at the time of failure, based on data maps or arithmetic expressions using the throttle opening as a parameter. The upper and lower limits may also be changed as needed, using various operating conditions, such as a vehicle speed, as parameters.

Where the upper limit of the input-side rotation speed at the time of a failure is to be defined, the upper limit may be set to a speed that allows the engine to produce approximately the maximum output. However, where the output of the engine changes at a relatively low rate in the vicinity of its maximum or peak, with respect to the revolution speed of the engine, for example, the upper limit is not necessarily to be set to the speed at which the output reaches its maximum. Rather, the upper limit may be set in accordance with the output characteristics, for example, within ±10%, preferably ±5%, of the rotation speed at which the maximum output is obtained. The upper limit may also be set within a speed range in which 80% or more, or 90% or more, of the maximum output can be obtained. The upper limit may be set using operating conditions such as a vehicle speed, as parameters, within a certain range in which the output almost reaches its maximum. In another form of the invention, the upper limit of the input-side rotation speed is not necessarily set to the speed at which the output of the engine almost reaches its maximum. For example, the upper limit may be set to a speed that allows the engine to provide an output required for limp-home. The upper limit of the input-side rotation speed at the time of a failure may also be defined in the case where any problem arises from an increase in the engine speed for any reason other than a reduction in the engine output.

Where the lower limit of the input-side rotation speed at the time of a failure is to be defined, the lower limit may be set to a speed that can provide the lowest or minimum booster pressure required for causing a brake booster to produce brake assist force. However, the lower limit may be set to a speed that can provide a certain booster pressure that results in a certain brake assist force. As in the case of the upper limit, the lower limit may be set within a suitable range using operating conditions such as a vehicle speed as parameters. In another form of the invention, the lower limit of the input-side rotation speed is not necessarily set in terms of the brake booster, but may be set in terms of other boosters or devices utilizing the intake manifold negative pressure or vacuum. The lower limit of the input-side rotation speed at the time of a failure may also be defined in the case where any problem arises from a reduction in the engine speed, for any reason other than a reduction in the intake manifold negative pressure.

The internal combustion engine may be a gasoline engine or a diesel engine that operates through combustion of fuel. In order to ensure that the engine can continue to operate even if the vehicle stops, a fluid coupling such as a torque converter, a friction-type clutch capable of continuously controlling torque to be transmitted, or the like, is disposed between the engine and a continuously variable transmission. However, these components are not necessarily provided in a hybrid vehicle that is able to start with an electric motor. As the continuously variable transmission to be controlled by the shift control apparatus of the invention, various types of transmissions, such as a belt-type CVT and a toroidal-type CVT, may be employed.

A presently preferred embodiment of the invention will be described in detail with reference to the drawings.

FIG. 1 is a schematic view of a vehicular drive unit 10 to which the invention is applied. The vehicular drive unit 10, which is of the transversely-mounted type, is favorably employed in a front-engine front-drive vehicle. The drive unit 10 includes an engine 12, such as an internal combustion engine, used as a driving source for running. The output of the engine 12 is transmitted from a torque converter 14 to a differential gear device 22 via a forward/backward drive switching device 16, a belt-type continuously variable transmission (CVT) 18 and reduction gears 20. The output transmitted to the differential gear device 22 is then distributed to left and right drive wheels 24L, 24R.

Figure 10:
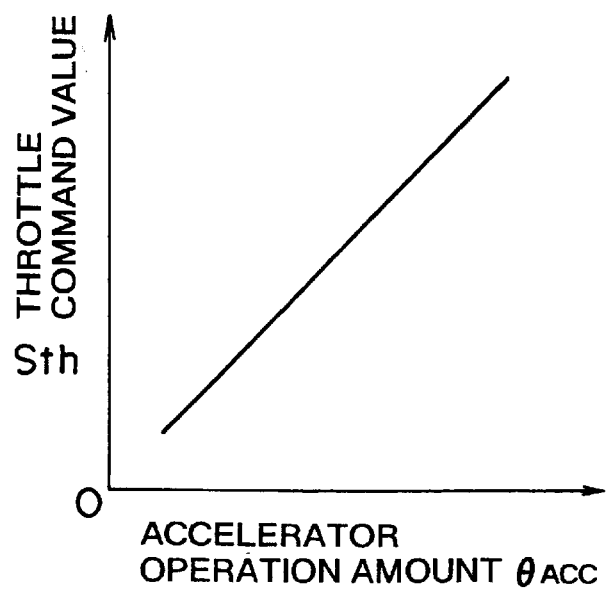
FIG. 10 is a graph showing, by way of example, the relationship between the throttle command value $S_{th}$ and the accelerator operation amount $\theta_{ACC}$.

The output of the engine 12 is controlled by an electronic throttle valve 26 for adjusting the flow rate of intake air. The throttle opening $\theta_{th}$ of the electronic throttle valve 26 is adjusted by means of an electric motor according to a throttle command value $S_{th}$ generated by a controller in accordance with an operation amount $\theta_{ACC}$ of the accelerator pedal, as shown in FIG. 10 by way of example. The operation amount $\theta_{ACC}$ of the accelerator pedal represents the output requirement indicated by the driver, or the power required by the driver. If the electric motor stops operating due to a failure in the control system, the electronic throttle valve 26 is fixed to a predetermined throttle opening $\theta_{thF}$ provided for the occasion of a failure by a mechanical device, such as a spring. The throttle opening $\theta_{thF}$ at the time of a failure is set, for example, to about 10%, depending upon the output characteristics of the engine 12, so that the vehicle exhibits suitable running performance that enables "limp-home" without greatly affecting braking operations.

A brake booster 30 is connected to an intake manifold 28 of the engine 12. With this arrangement, the force applied to a brake pedal 32 (the braking force) is assisted by a negative pressure in the intake manifold 28.

The forward/backward drive switching device 16 consists of a planetary gear unit of the double-pinion type. A turbine shaft 34 of the torque converter 14 is connected to a sun gear 16s, and an input shaft 36 of the continuously variable transmission 18 is connected to a carrier 16c. If a clutch 38 disposed between the carrier 16c and the sun gear 16s is engaged, the forward/backward drive switching device 16 is rotated as a unit, so that the turbine shaft 34 is directly connected to the input shaft 36 and the forward driving force is transmitted to the drive wheels 24R, 24L. If a brake 40 disposed between a ring gear 16r and a housing is engaged while the clutch 38 is released, the input shaft 36 is rotated in a reverse direction with respect to the turbine shaft 34, so that a backward driving force is transmitted to the drive wheels 24R, 24L.

Figure 3:
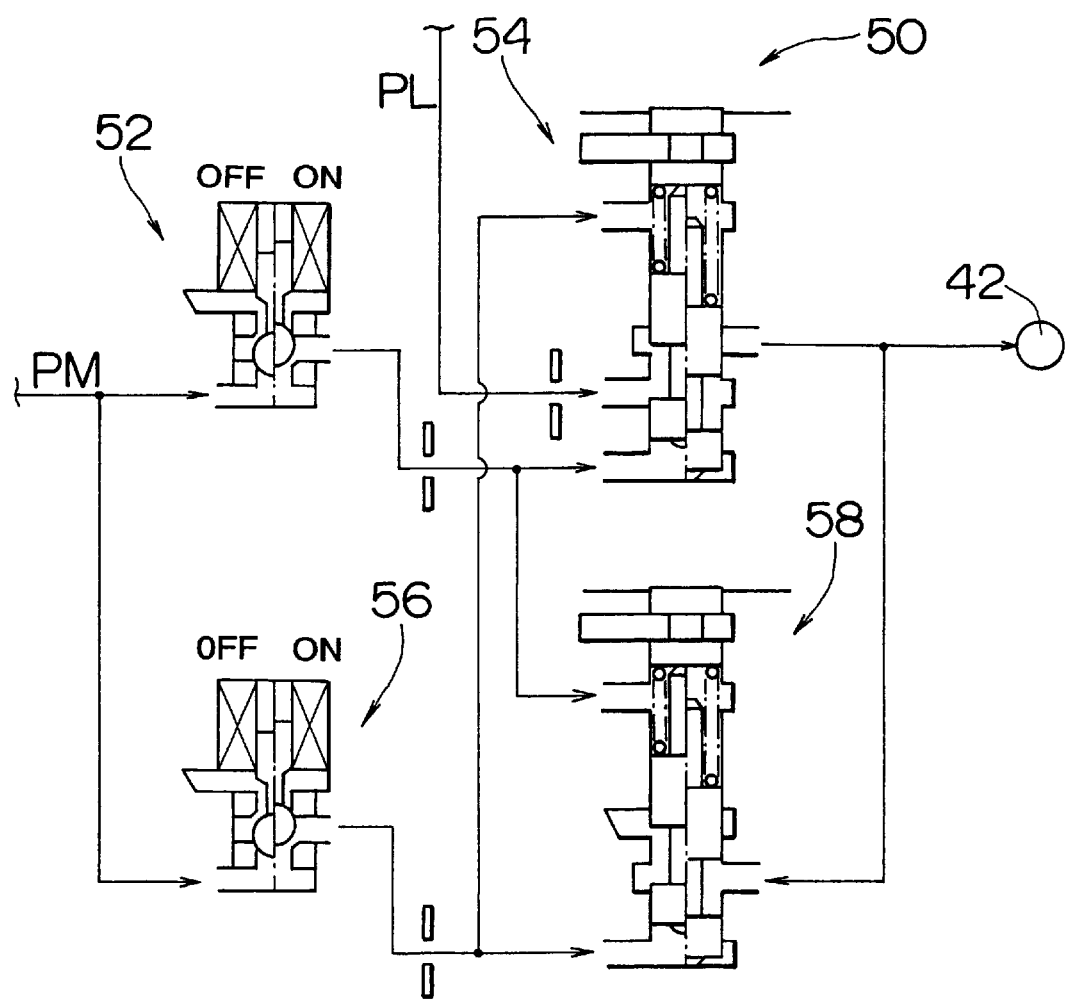
FIG. 3 is a hydraulic circuit diagram showing an example of the shift control circuit as shown in FIG. 2.

The continuously variable transmission 18 includes an input-side variable pulley 42, an output-side variable pulley 46 and a drive belt 48 that is wound around the variable pulleys 42, 46. The input-side variable pulley 42 is mounted on the input shaft 36 and has a variable effective diameter. The output-side variable pulley 46 is mounted on the output shaft 44 and has a variable effective diameter. The variable pulleys 42, 46 have variable V-groove widths. The hydraulic pressure to be applied to the input-side variable pulley 42 is controlled, for example, by a shift control circuit 50 as shown in FIG. 3. With the hydraulic pressure thus controlled, the V-groove widths of the variable pulleys 42. 46 and the winding diameter (the effective diameter) of the drive belt 48 are changed. As a result, the speed ratio γ(=the input-side rotation speed NIN/the output-side rotation speed NOUT) is continuously changed.

The shift control circuit 50 as shown in FIG. 3 includes an upshift solenoid-operated valve 52, a flow control valve 54, a downshift solenoid-operated valve 56 and a flow control valve 58. The upshift solenoid-operated valve 52 and the flow control valve 54 are operable to reduce the speed ratio γ. The downshift solenoid-operated valve 56 and the flow control valve 58 are operable to increase the speed ratio γ. The shift control circuit 50 operates in a similar manner to that as disclosed in Japanese Patent Laid-Open Publication No. HEI 11-182657. If the duty ratio of the upshift solenoid-operated valve 52 is controlled by a shift controller 60 (see FIG. 2), a certain control pressure, to which the modulator pressure PM is reduced, is transmitted to the flow control valve 54. The line pressure PL is regulated in response to the control pressure and then supplied to the input-side variable pulley 42, which results in a reduction in the V-groove width of the input-side variable pulley 42, and a reduction in the speed ratio γ. If the duty ratio of the downshift solenoid-operated valve 56 is controlled by the shift controller 60, a certain control pressure, to which the modulator pressure PM is reduced, is transmitted to the flow control valve 58. A drain port is opened in response to the control pressure, whereby working fluid in the input-side variable pulley 42 is drained at a suitable flow rate. As a result, the V-groove width is increased, resulting in an increase in the speed ratio γ. The hydraulic pressure applied to the output-side variable pulley 46 is regulated, for example, in accordance with the torque to be transmitted by the CVT, so that a desired belt tension is obtained.

Figure 2:
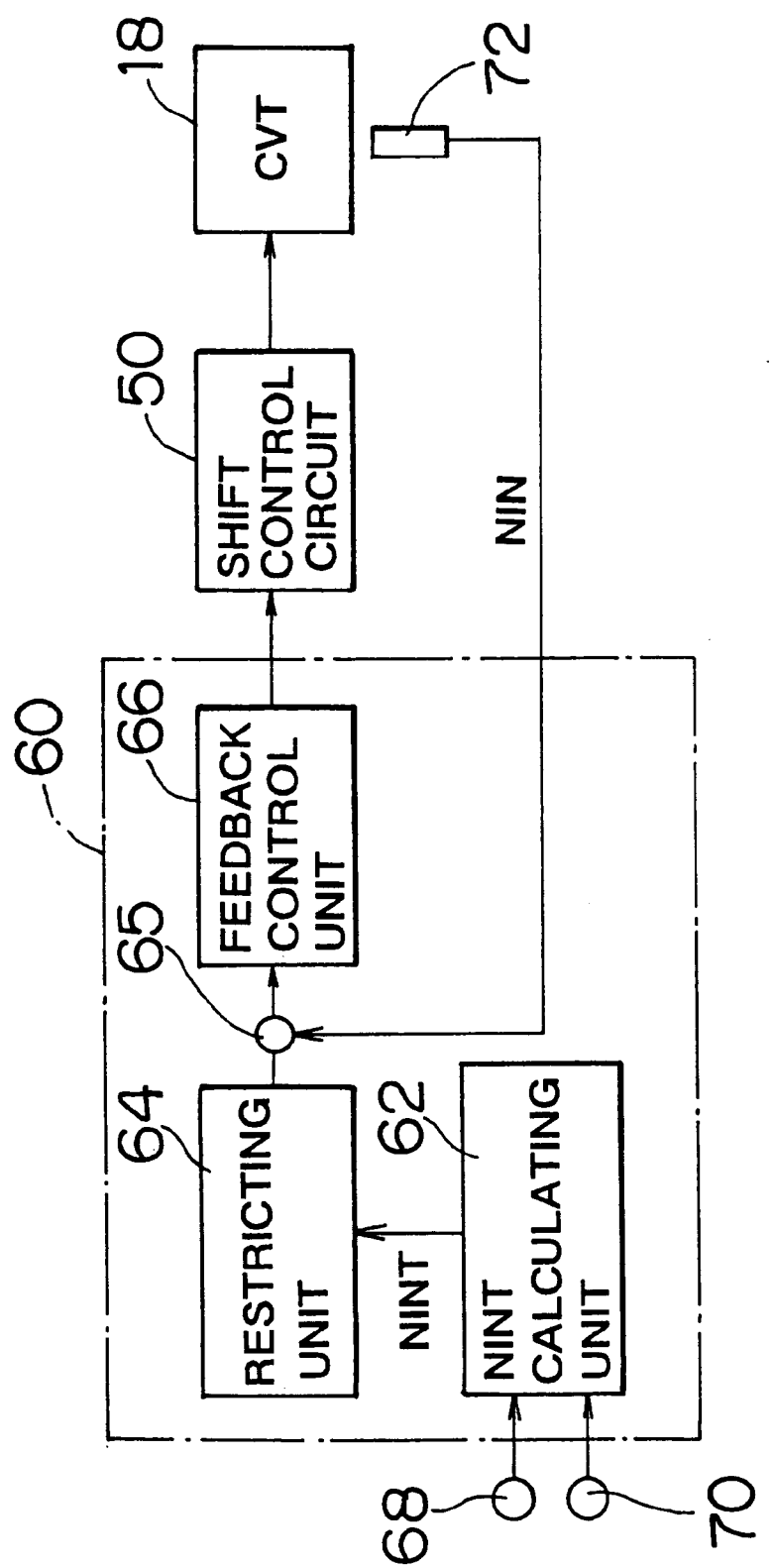
FIG. 2 is a block diagram useful for explaining a shift control apparatus for a continuously variable transmission in the drive unit shown in FIG. 1.

The shift controller 60 shown in FIG. 2 includes a microcomputer. The shift controller 60 performs signal processing according to programs prestored in a ROM, utilizing the temporary storage function of a RAM, so as to perform shift control on the continuously variable transmission 18. The shift controller 60 is functionally provided with an NINT calculating unit 62, a restricting unit 64, a comparing unit 65 and a feedback control unit 66. The shift controller 60 constitutes a principal part of the shift control apparatus.

Figure 4:
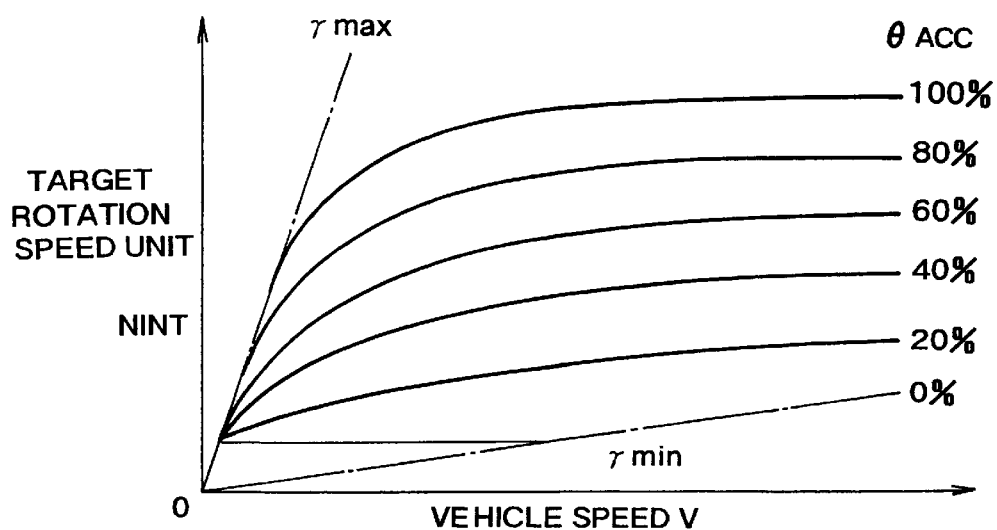
FIG. 4 is a graph showing an example of shift conditions that are used when an NINT calculating unit of FIG. 2 calculates a target rotation speed NINT.

Signals indicative of the operation amount $\theta_{ACC}$ of the accelerator pedal and the vehicle speed V (more specifically, the rotation speed NOUT of the output shaft 44) are supplied to the NINT calculating unit 62 from an accelerator sensor 68 and a vehicle speed sensor 70, respectively. The NINT calculating unit 62 calculates a target rotation speed NINT, which is a target value of the input-side rotation speed NIN, according to shift conditions that are determined using operation states of the vehicle, such as the accelerator operation amount $\theta_{ACC}$ and the vehicle speed V, as parameters. The shift conditions are defined by data maps, arithmetic expressions, or the like, such that the target rotation speed NINT is set in such a manner that the speed ratio γ increases as the vehicle speed V decreases and the accelerator operation amount $\theta_{ACC}$ increases, as shown in FIG. 4 by way of example. The shift conditions are stored in advance in a storage device such as ROM. Because the vehicle speed V corresponds to the output-side rotation speed NOUT, the target rotation speed NINT, which is a target value of the input-side rotation speed NIN, corresponds to the target speed ratio, and is set within a range from the minimum speed ratio γmin to the maximum speed ratio γmax of the continuously variable transmission 18. The accelerator operation amount $\theta_{ACC}$ corresponds to the output requirement indicated by the driver (the power demanded by the driver).

As shown in FIG. 4 by way of example, during normal running of the vehicle (i.e., when the electronic throttle valve 26 is not faulty), the speed ratio of the continuously variable transmission 18 is suitably controlled to be within a region that is defined by the maximum speed ratio γmax and the minimum speed ratio γmin. Furthermore, the target rotation speed NINT of the input shaft of the CVT 18 is held in a range defined between the upper limit corresponding to the maximum output requirement (where the accelerator operation amount $\theta_{ACC}$ is 100%) and the lower limit corresponding to the minimum output requirement (where the accelerator operation amount $\theta_{ACC}$ is 0%).

Figure 5:
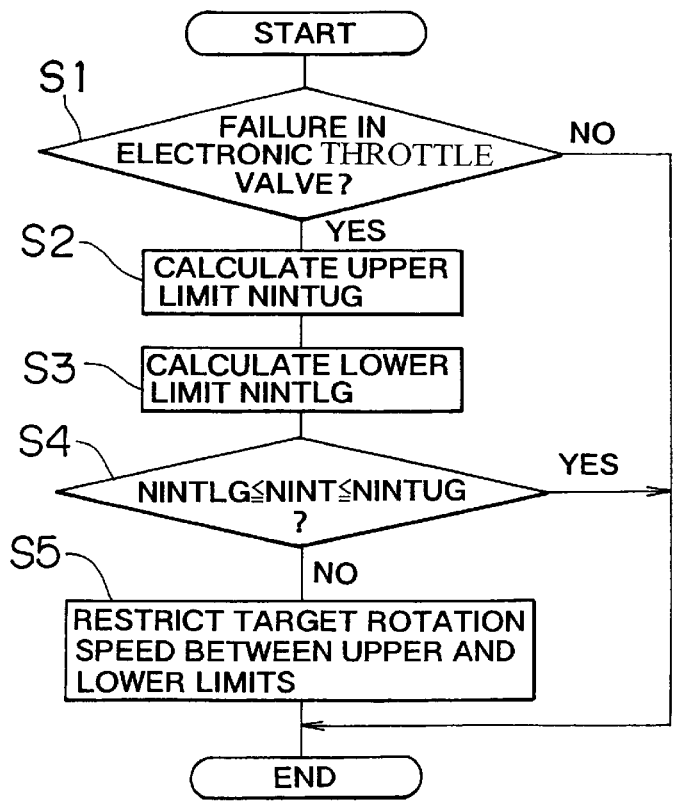
FIG. 5 is a flowchart useful for explaining the operations to be performed by the restricting unit of FIG. 2.

The restricting unit 64 sets the upper and lower limits of the target rotation speed NINT when the electronic throttle valve 26 fails, and performs signal processing according to, for example, a flowchart as shown in FIG. 5. As will be understood later, the upper and lower limits set by the restricting unit 64 define a narrower or smaller range than that defined by the upper and lower limits established for normal running of the vehicle as described above. In step S1 of FIG. 5, it is judged whether the electronic throttle valve 26 is faulty, for example, based on a deviation of an actual throttle opening $\theta_{th}$ detected by a throttle opening sensor 74 (see FIG. 1) from a throttle command value $S_{th}$, or depending on whether the throttle opening $\theta_{th}$ substantially coincides with the preset throttle opening $\theta_{thF}$ for the occasion of a failure. If the electronic throttle valve 26 is not faulty, the routine is immediately terminated so that the target rotation speed NINT is outputted as it is to the comparing unit 65. However, if the throttle opening $\theta_{th}$ has been fixed to the failure-time throttle opening $\theta_{thF}$ due to a failure in the control system, for example, step S2 and subsequent steps are then executed.

Figure 7:
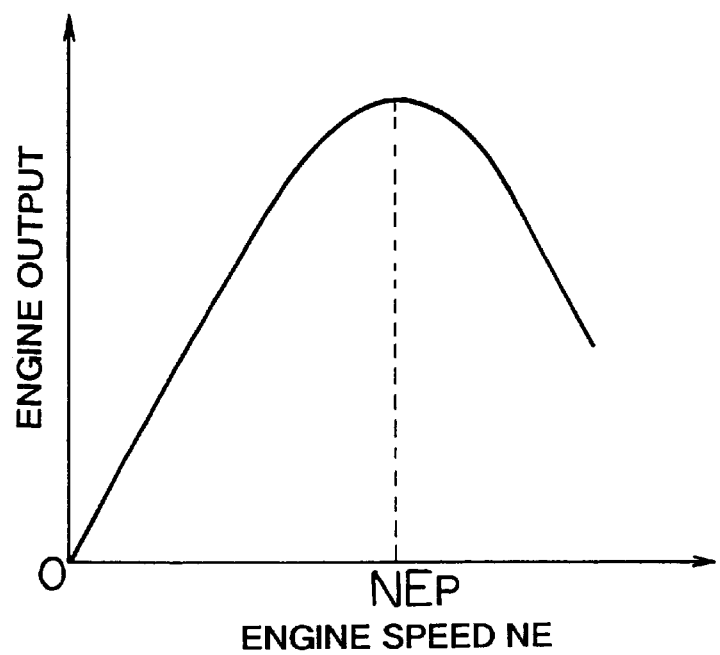
FIG. 7 is a graph showing an example of output characteristics of the engine when the electronic throttle valve is faulty.

In step S2, the upper limit NINTUG is set. The upper limit NINTUG may be set, for example, to a predetermined rotation speed $NE_P$ at which the engine output reaches its maximum, based on the torque characteristics of the engine 12 when the throttle opening with $\theta_{th}$ equal to the failure-time valve opening $\theta_{thF}$ as shown in FIG. 6. In this embodiment, however, the upper limit NINTUG is calculated from a predetermined map or arithmetic expression(s) using a vehicle speed V and other parameters, so as to be set within ±5% of the rotation speed $NE_P$. FIG. 7 shows a relationship between the engine output and the engine speed NE. The engine output does not change at a considerably high rate in the vicinity of the rotation speed $NE_P$ (within the range of ±5%). If the engine speed NE increases to be higher than ±5% of $NE_P$, the rate of change (reduction) of the engine output increases. In this embodiment, since the engine speed NE is approximately equal to the input-side rotation speed NIN during forward running of the vehicle (the engine speed NE is exactly equal to the input-side rotation speed NIN when a lock-up clutch of the torque converter 14 is ON), the engine speed NE can be used as the input-side speed NIN. However, if any shift operation is performed between the engine and the continuously variable transmission 18, the engine speed NE needs to be corrected by taking account of the speed ratio or change gear ratio, so as to obtain the input-side rotation speed NIN. The map and/or arithmetic expressions(s) used for calculating the upper limit NINTUG are stored in a storage unit such as a ROM.

Figure 9:
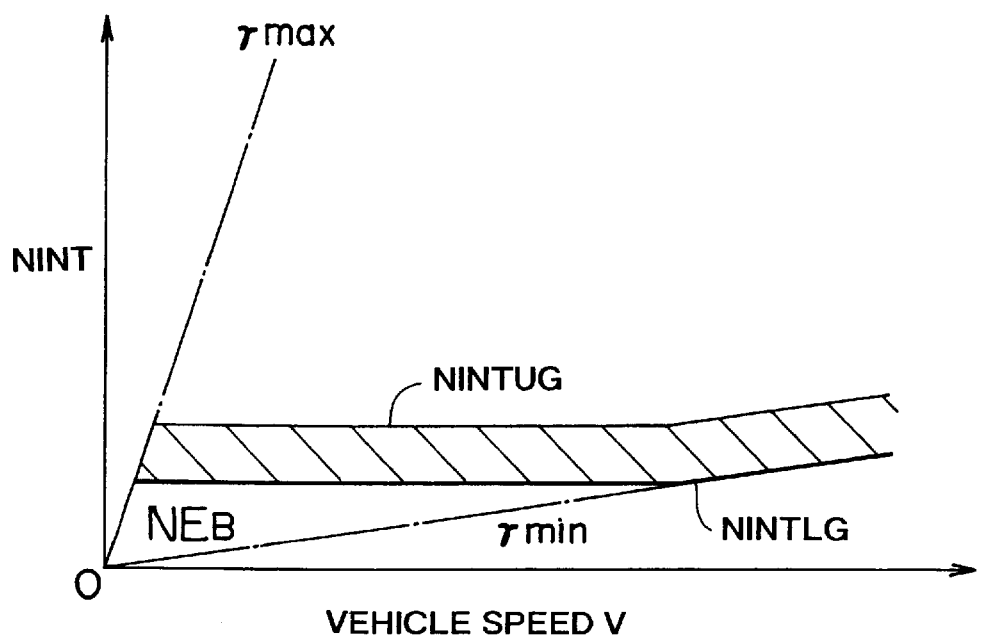
FIG. 9 shows an example of upper limit NINTUG and lower limit NINTLG between which the target rotation speed NINT is restricted by the restricting unit of FIG. 2.

In step S3, the lower limit NINTLG is set. The lower limit NINTLG may be set, for example, to a predetermined rotation speed $NE_B$ at which the minimum booster pressure $P_B$ required for an operation of the brake booster 30 is obtained, based on the intake manifold negative pressure characteristics of the engine 12 (which are substantially the same as the torque characteristics) when the throttle opening $\theta_{th}$ is equal to the failure-time valve opening $\theta_{th}$ as shown in FIG. 6. In this embodiment, while the lower limit NINTLG is set to the predetermined rotation speed $NE_B$ within the shift range of the continuously variable transmission 18 as shown in FIG. 9, the lower limit NINTLG increases with an increase in the vehicle speed V in a high vehicle-speed region (FIG. 9) in which the lower limit NINTLG, if it is kept constant, would fall below the minimum speed ratio γmin. Thus, in the high vehicle-speed region, the lower limit NINTLG corresponds to the minimum speed ratio γmin.

Figure 8:
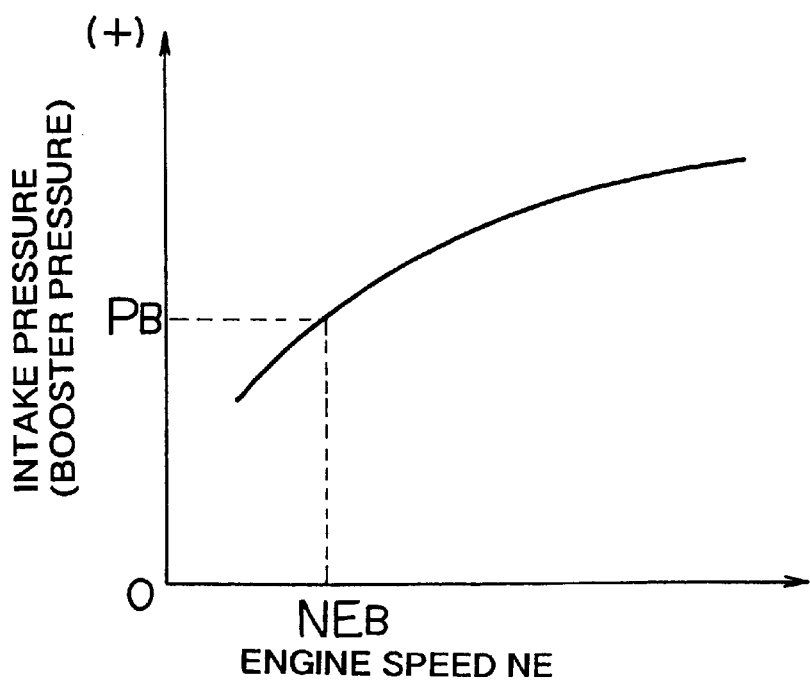
FIG. 8 shows an example of negative pressure characteristics of the intake manifold of the engine when the electronic throttle valve is faulty.

FIG. 8 shows a relationship between the intake manifold negative pressure and the engine speeds NE (which is substantially the same as FIG. 6). As the engine speed NE decreases, the intake manifold negative pressure is reduced. Also in this case, if any shift operation is performed between the engine 12 and the continuously variable transmission 18, the lower limit NINTLG is set by taking account of the speed ratio or change gear ratio. A map and/or arithmetic expression(s) used for calculating the lower limit NINTLG are stored in a storage unit such as a ROM. While the upper limit NINTUG may be basically set within the range of ±5% of the rotation speed $NE_P$, it is desirable to increase the upper limit NINTUG in accordance with an increase in the lower limit NINTLG in the high vehicle-speed region in which the lower limit NINTLG increases, as shown in FIG. 9.

In the next step S4, it is judged whether or not the target rotation speed NINT is within the range from the lower limit NINTLG to the upper limit NINTUG. If the target rotation speed NINT is within this range, the routine is immediately terminated, and the target rotation speed NINT is outputted as it is to the comparing unit 65. However, if the target rotation speed NINT is below the lower limit NINTLG or above the upper limit NINTUG, a restricting operation is performed in step S5. More specifically, if the target rotation speed NINT is below the lower limit value NINTLG, the lower limit NINTLG replaces the target rotation speed NINT, namely, the lower limit NINTLG is defined as the updated target rotation speed NINT. Similarly, if the target rotation speed NINT is below the upper limit NINTUG, the upper limit NINTUG replaces the target rotation speed NINT, namely, the upper limit NINTUG is defined as the updated target rotation speed NINT. Thus, when the electronic throttle valve 26 is faulty, the target rotation speed NINT is restricted to the range between the lower limit NINTLG and the upper limit NINTUG.

Referring again to FIG. 2, the comparing unit 65 receives a signal indicative of the actual input-side rotation speed NIN from the input-side rotation speed sensor 72, to calculate a speed deviation ΔNIN of the actual input-side rotation speed NIN from the target rotation speed NINT supplied from the restricting unit 64. The comparing unit 65 then outputs the speed deviation ΔNIN to the feedback control unit 66. The input-side rotation speed sensor 72 is disposed to detect, for example, the rotation speed of the input-side variable pulley 42. However, as a matter of course, the sensor 72 may also be adapted to detect the rotation speed of the input shaft 36, or detect the rotation speed of the turbine shaft 34, or the like, which has a predetermined relationship with the rotation speed of the input shaft.

The feedback control unit 66 performs feedback control on the solenoid-operated valves 52, 56 of the shift control circuit 50 so that the speed deviation ΔNIN becomes equal to 0. As a result, the actual input-side rotation speed NIN is made approximately equal to the target rotation speed NINT. Consequently, the speed ratio γ of the continuously variable transmission 18 is suitably controlled in accordance with the accelerator operation amount $θ_{ACC}$ and the vehicle speed V. When the electronic throttle valve 26 is faulty, shift control is restricted such that the input-side rotation speed NIN (the target rotation speed NINT) of the continuously variable transmission 18 falls within the range between the upper limit NINTUG and the lower limit NINTLG as indicated by the hatched area in FIG. 9. Accordingly, the engine speed NE is maintained in the range between the upper limit NINTUG and the lower limit NINTLG.

The upper limit NINTUG is approximately equal to the rotation speed $NE_P$ at which the output of the engine 12 reaches its maximum at the failure-time throttle opening $θ_{thF}$. In the shift control of the continuously variable transmission 18, therefore, the engine speed NE of the engine 12 is prevented from becoming excessively high with a result of a reduction in the engine output, thus eliminating such a problem that the driving torque of the vehicle is reduced in spite of an increase in the accelerator operation amount $θ_{ACC}$. Suppose that shift control is performed according to the shift conditions as shown in FIG. 4 when the electronic throttle valve 26 is fixed to the failure-time throttle opening $θ_{thF}$ in the event of a failure. In this case, if the accelerator operation amount $θ_{ACC}$ is kept substantially equal to 100% since the vehicle speed V does not increase, the speed ratio γ of the continuously variable transmission 18 increases, and the engine speed NE increases and exceeds $NE_P$, with a result of a reduction in the engine output as is apparent from FIG. 7. As a result, even if the torque is amplified in accordance with the speed ratio γ of the continuously variable transmission 18, the running performance (the driving torque) may deteriorate.

The lower limit NINTLG is set on the basis of the rotation speed $NE_B$ at which the minimum booster pressure $P_B$ is obtained while the engine 12 is operating with the failure-time throttle opening $θ_{thF}$. Therefore, when the vehicle is stopped, for example, the engine speed NE of the engine 12 is prevented from becoming too low to provide the required booster pressure. This also avoids such a situation that the brake assist force is reduced due to insufficient booster pressure, and the driver feels uncomfortable when applying a brake to the vehicle. In this embodiment, in the event of a failure in the electronic throttle valve 26, the opening of the throttle valve 26 is fixed to the failure-time throttle opening $θ_{thF}$ (e.g. approximately equal to 10%) which provides suitable running performance that enables limp-home. As is apparent from FIG. 6, the intake manifold negative pressure (the booster pressure) is smaller at the failure-time throttle opening $θ_{thF}$ as compared with the case where the throttle opening $θ_{th}$ is equal to 0, and the minimum booster pressure $P_B$ cannot be obtained when the engine speed NE is lower than $NE_B$.

The NINT calculating unit 62 calculates the target rotation speed NINT according to the predetermined or fixed shift conditions as shown in FIG. 4, regardless of whether there is a failure in the electronic throttle valve 26 or not. However, the NINT calculating unit 62 may also be designed to calculate the target rotation speed NINT according to shift conditions exclusively established for the occasion of a failure. For example, when the electronic throttle valve 26 is faulty, shift control may be performed solely based on the accelerator operation amount $θ_{ACC}$, as disclosed in Japanese Patent No. 2616154.

In the aforementioned embodiment, the target rotation speed NINT is limited to the range between the upper limit NINTUG and the lower limit NINTLG. It is, however, possible to define a range using only one of the upper limit NINTUG and the lower limit NINTLG, and restrict the target rotation speed NINT to this range.

Although the embodiment of the invention has been described in detail with reference to the drawings, it is to be understood that the embodiment is nothing more than one mode of implementing the invention. That is, the invention can be embodied with various changes or improvements, based on the knowledge of those skilled in the art.

What is claimed is:

1. A shift control apparatus for a motor vehicle including an internal combustion engine whose output is controlled by an electronic throttle valve for adjusting the flow rate of intake air, and a continuously variable transmission disposed in a power transmission path between the internal combustion engine and drive wheels, and operable to change a speed ratio thereof, comprising:

a shift control device configured and connected to control the speed ratio of the continuously variable transmission depending upon operating conditions of the vehicle, such that an input-side rotation speed of the transmission is variable within a first range during normal running of the vehicle;

a fault detecting unit configured and connected to determine whether the electronic throttle valve is at fault or not; and a restricting unit configured and connected to restrict the speed ratio of the continuously variable transmission such that the input-side rotation speed of the transmission is variable within a second range when the fault detecting unit determines that the electronic throttle valve is at fault, said second range being set to be narrower than said first range.

2. A shift control apparatus according to claim 1, wherein said restricting unit comprises an upper-limit setting unit that sets an upper limit of the input-side rotation speed of the continuously variable transmission, and restricts the speed ratio of the transmission so that the input-side rotation speed does not exceed the upper limit when the electronic throttle valve is faulty.

3. A shift control apparatus according to claim 2, wherein the upper limit of the input-side rotation speed at the time of a failure in the electronic throttle valve is approximately equal to a rotation speed at which the output of the internal combustion engine reaches a maximum thereof at a throttle opening of the electronic throttle valve that is established when the electronic throttle valve is faulty.

4. A shift control apparatus according to claim 1, wherein said restricting unit comprises a lower-limit setting unit that sets a lower limit of the input-side rotation speed of the continuously variable transmission, and restricts the speed ratio of the transmission so that the input-side rotation speed does not fall below the lower limit when the electronic throttle valve is faulty.

5. A shift control apparatus according to claim 4, wherein
the vehicle further includes a brake booster that utilizes an intake manifold negative pressure of the internal combustion engine so as to assist in a braking operation, and wherein
the lower limit of the input-side rotation speed at the time of a failure in the electronic throttle valve is approximately equal to a rotation speed at which a certain intake manifold negative pressure required for operating the brake booster is obtained by an operation of the engine at a throttle opening of the electronic throttle valve that is established when the electronic throttle valve is faulty.

6. A shift control apparatus according to claim 1, wherein said restricting unit comprises an upper-limit and lower-limit setting unit that sets an upper limit and a lower limit of the input-side rotation speed of the continuously variable transmission, and restricts the speed ratio of the transmission so that the input-side rotation speed is held between the upper limit and the lower limit when the electronic throttle valve is faulty.

7. A shift control apparatus according to claim 6, wherein the upper limit of the input-side rotation speed at the time of a failure in the electronic throttle valve is approximately equal to a rotation speed at which the output of the internal combustion engine reaches a maximum thereof at a throttle opening of the electronic throttle valve that is established when the electronic throttle valve is faulty.

8. A shift control apparatus according to claim 6, wherein
the vehicle further includes a brake booster that utilizes an intake manifold negative pressure of the internal combustion engine so as to assist in a braking operation, and wherein
the lower limit of the input-side rotation speed at the time of a failure in the electronic throttle valve is approximately equal to a rotation speed at which a certain intake manifold negative pressure required for operating the brake booster is obtained by an operation of the engine at a throttle opening of the electronic throttle valve that is established when the electronic throttle valve is faulty.

9. A shift control apparatus according to claim 1, further comprising:
a target speed setting unit that sets a target input-side rotation speed of the continuously variable transmission based on operating conditions of the vehicle, said target input-side rotation speed being variable within the first range during normal running of the vehicle;
wherein said shift control device controls the speed ratio of the continuously variable transmission so that the input-side rotation speed of the continuously variable transmission becomes substantially equal to the target input-side rotation speed of the continuously variable transmission;
wherein said restricting unit restricts the speed ratio of the continuously variable transmission such that the target input-side rotation speed of the transmission is variable within the second range when the fault detecting unit determines that the electronic throttle valve is faulty.

10. A shift control apparatus according to claim 9, wherein said restricting unit comprises an upper-limit setting unit that sets an upper limit of the target input-side rotation speed of the continuously variable transmission, and restricts the speed ratio of the transmission so that the target input-side rotation speed does not exceed the upper limit when the electronic throttle valve is faulty.

11. A shift control apparatus according to claim 9, wherein said restricting unit comprises a lower-limit setting unit that sets a lower limit of the target input-side rotation speed of the continuously variable transmission, and restricts the speed ratio of the transmission so that the target input-side rotation speed does not fall below the lower limit when the electronic throttle valve is faulty.

12. A shift control apparatus according to claim 9, wherein said restricting unit comprises an upper-limit and lower-limit setting unit that establishes an upper limit and a lower limit of the target input-side rotation speed of the continuously variable transmission, and restricts the speed ratio of the transmission so that the target input-side rotation speed is held between the upper limit and the lower limit when the electronic throttle valve is faulty.

13. A method of controlling a continuously variable transmission of a motor vehicle which includes an internal combustion engine whose output is controlled by an electronic throttle valve for adjusting the flow rate of intake air, and a continuously variable transmission disposed in a power transmission path between the internal combustion engine and drive wheels and operable to change a speed ratio thereof, comprising the steps of:
controlling the speed ratio of the continuously variable transmission depending upon operating conditions of the vehicle, such that an input-side rotation speed of the transmission is variable within a first range during normal running of the vehicle;
determining whether the electronic throttle valve is faulty or not; and
restricting the speed ratio of the continuously variable transmission such that the input-side rotation speed of the transmission is variable within a second range when the electronic throttle valve is faulty, said second range being set to be narrower than said first range.

14. A method according to claim 13, wherein said step of restricting the speed ratio comprises a sub-step of setting an upper limit of the input-side rotation speed of the continuously variable transmission, and a sub-step of restricting the speed ratio of the transmission so that the input-side rotation speed does not exceed the upper limit when the electronic throttle valve is faulty.

15. A method according to claim 14, wherein the upper limit of the input-side rotation speed at the time of a failure in the electronic throttle valve is approximately equal to a rotation speed at which the output of the internal combustion engine reaches a maximum thereof at a throttle opening of the electronic throttle valve that is established when the electronic throttle valve is faulty.

16. A method according to claim 13, wherein said step of restricting the speed ratio comprises a sub-step of setting a lower limit of the input-side rotation speed of the continuously variable transmission, and a sub-step of restricting the speed ratio of the transmission so that the input-side rotation speed does not fall below the lower limit when the electronic throttle valve is faulty.

17. A method according to claim 16, wherein
the vehicle further includes a brake booster that utilizes an intake manifold negative pressure of the internal combustion engine so as to assist in a braking operation, and wherein
the lower limit of the input-side rotation speed at the time of a failure in the electronic throttle valve is approximately equal to a rotation speed at which a certain intake manifold negative pressure required for operating the brake booster is obtained by an operation of the engine at a throttle opening of the electronic throttle valve that is established when the electronic throttle valve is faulty.

18. A method according to claim 13, wherein said step of restricting the speed ratio comprises a sub-step of setting an upper limit and a lower limit of the input-side rotation speed of the continuously variable transmission, and a sub-step of restricting the speed ratio of the transmission so that the input-side rotation speed is held between the upper limit and the lower limit when the electronic throttle valve is faulty.

19. A method according to claim 18, wherein the upper limit of the input-side rotation speed at the time of a failure in the electronic throttle valve is approximately equal to a rotation speed at which the output of the internal combustion engine reaches a maximum thereof at a throttle opening of the electronic throttle valve that is established when the electronic throttle valve is faulty.

20. A method according to claim 18, wherein
the vehicle further includes a brake booster that utilizes an intake manifold negative pressure of the internal combustion engine so as to assist in a braking operation, and wherein
the lower limit of the input-side rotation speed at the time of a failure in the electronic throttle valve is approximately equal to a rotation speed at which a certain intake manifold negative pressure required for operating the brake booster is obtained by an operation of the engine at a throttle opening of the electronic throttle valve that is established when the electronic throttle valve is faulty.

* * * * *